United States Patent [19]

Voillat

[11] Patent Number: 4,949,359
[45] Date of Patent: Aug. 14, 1990

[54] METHOD FOR THE ELECTRONIC TRANSMISSION OF DATA AND INSTALLATION FOR CARRYING OUT THIS METHOD

[75] Inventor: Jean-Pierre Voillat, Delemont, Switzerland

[73] Assignee: Willemin Electronis S.A., Switzerland

[21] Appl. No.: 241,034

[22] Filed: Sep. 6, 1988

[30] Foreign Application Priority Data

Sep. 9, 1987 [CH] Switzerland .................. 3490/87

[51] Int. Cl.$^5$ .................. H04L 7/00; H04L 25/38
[52] U.S. Cl. .................. 375/106; 375/117; 340/310 R; 370/85.9
[58] Field of Search .................. 455/39, 3, 4; 370/85, 370/86, 89, 85.1, 85.9, 85.11; 375/7, 8, 106, 107, 109, 117; 340/825.5, 825.05, 825.06, 825.2, 310 A, 310 R

[56] References Cited

U.S. PATENT DOCUMENTS

4,476,467 10/1984 Terwilliger et al. .................. 370/85
4,550,402 10/1985 Gable et al. .................. 370/85
4,670,872 6/1987 Cordill .................. 370/85

Primary Examiner—Reinhard J. Eisenzopf
Assistant Examiner—Curtis Kuntz
Attorney, Agent, or Firm—Silverman, Cass & Singer, Ltd.

[57] ABSTRACT

A method and an installation permit the electronis transmission of data between a master station and slave stations and the simultaneous return of data in the direction of the master station, and this by means of a bus having only two conductors. The digital signals emitted by the master station are at the same time control signals feeding in power to the slave stations. The bits of these signals are of a shape such that they present dead zones during which these signals do not have any effect and during which one can interrupt the faithful transmission, while putting at high impedance one of the conductors of the bit, which allows a momentary alteration of the signal. Such an alteration is obtained by loading strongly the conductor put at high impedance, the presence or the absence of such an alteration constituting the data which has to be transmitted from one slave station to the master station.

10 Claims, 5 Drawing Sheets

| | $L_1$ | $L_2$ | STATIONS FED | REFERENCE Ø VOLT | AUTHORIZATION |
|---|---|---|---|---|---|
| STATES OF THE BUFFERS | Ø | Ø | NO | YES | MOMENTARY |
| | Ø | 1 | YES | YES | PERMANENT |
| | 1 | Ø | YES | YES | PERMANENT |
| | 1 | 1 | NO | NO | NO |
| | Ø | X | NO | YES | MOMENTARY* |
| | X | Ø | NO | YES | MOMENTARY* |
| | 1 | X | NO | NO | NO |
| | X | 1 | NO | NO | NO |
| | X | X | NO | NO | NO |

FIG. 4     * "DEAD" TIMES OF THE BITS

FIG. 5

METHOD FOR THE ELECTRONIC TRANSMISSION OF DATA AND INSTALLATION FOR CARRYING OUT THIS METHOD

BACKGROUND OF THE INVENTION (a) Field of the Invention

The present invention relates to a method of electronic transmission of data between a master station and slave stations, with feeding in of power to the slave stations by the master station.

The invention also relates to an installation for carrying out the method.

(b) Description of the Prior Art

The conventional electronic installations of data control (especially the programmable automatized devices) are practically always realized on the basis of a centralized architecture while the infrastructures producing or using the said data are widely distributed in complexes relating to a specific machine or to large public buildings.

Such a conception has the result that a large number of conductors are necessary which connect, by means of a very extensive wiring, a central installation to all kinds of physical terminal elements.

There are comparatively few and relatively expensive installations which allow treatment of data at the location of exploitation thereof, which use relatively complex internal information transmission buses and which, anyway, do not permit the supply or feeding in of power to the several terminals.

SUMMARY OF THE INVENTION

The object of the present invention is to permit the "split" of the central installation of data control into several "mini-installations" (slave stations) situated at the exact place or location of the utilization thereof, connected to a master station by a bus which is reduced to two wires, serving at the same time to feeding of power to the slave stations and their physical ending elements, to transmit to these ending elements messages coming from the master station and, simultaneously, to transmit messages from the slave stations towards the master station.

This object is achieved due to the fact that, according to the method, there is used for connecting the master station to the slave stations a bus comprising at least two conductors and given to the slave stations, by interrupting momentary the faithful transmission of the signal produced by the master station on one of the two conductors of the bus the possibility of altering the data received by said slave stations, the presence or the absence of such alterations constituting information which the slave stations transmit to the master station, the bits of the data carrying signals transmitted by the master station having a shape such that they are not of one piece but present at least one dead zone where they have no effect, during which dead zone is effected the momentary interruption of the faithful transmission of the signal on one of the two conductors of the bus without this interruption having any influence on the reception by the slave stations of the signals from the master station, the whole in such a way as to permit the slave stations to transmit data back towards the master station at the same time as they receive data from the master station.

The object is also achieved due to the fact that the installation comprises a master station and several slave stations, a connecting bus connecting all of these stations and which comprises only two conductors, means in the master station for the emission of digital signals intended for the slave stations which serve for the feeding and the control of these slave stations, the shape of each bit of these signals presenting at least one dead zone, means in the slave stations for the reception and the interpretation of said signals, means in the master station for the interruption of the faithful transmission of said signals on one of the two conductors of the bus, operating during the dead zones of the bits of these signals, and means enabling the slave stations to send back information to the master station during said interruptions of faithful transmission, the whole in such a way that this sending back of information to the master station has no influence on the reception, by the slave stations, of the signals emitted by the master station.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
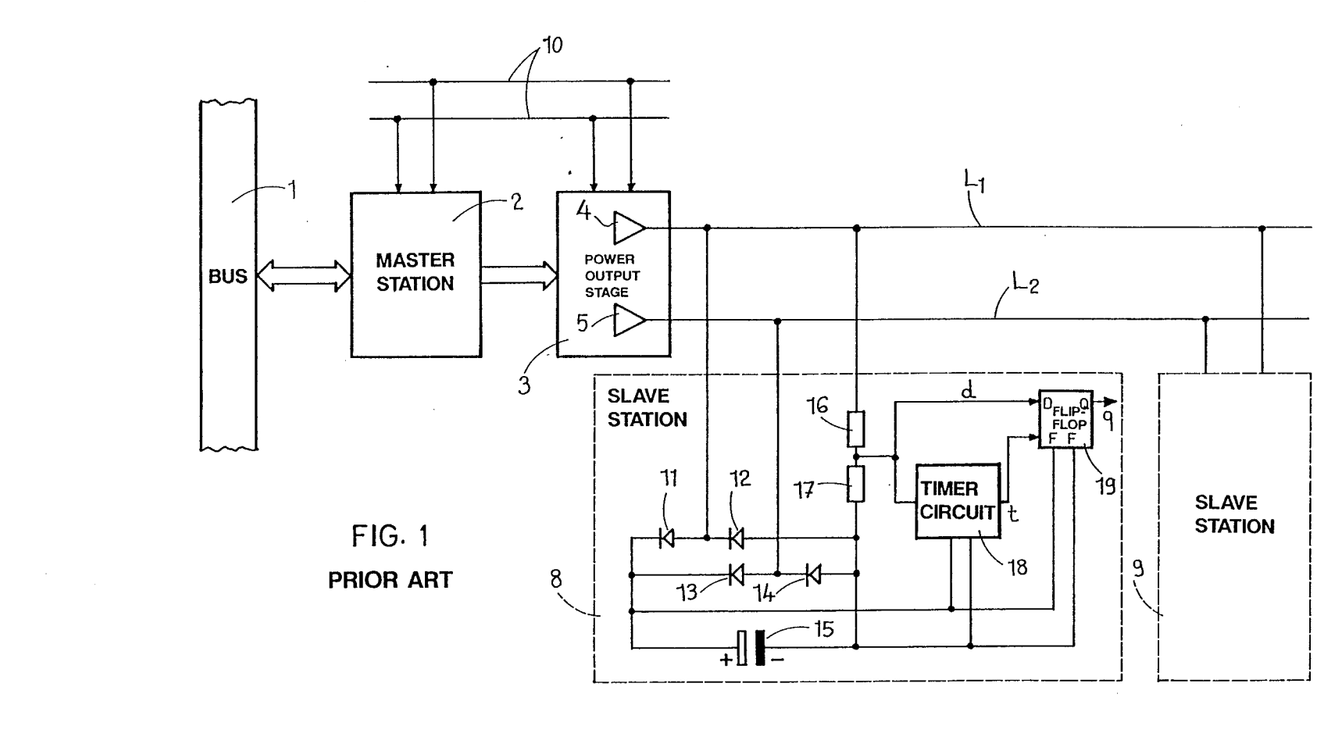
FIG. 1 is the circuit diagram of a known installation for the electronic transmission of data in which the routing of data or information occurs only in the one direction from a master station towards slave stations.

The known installation illustrated in FIG. 1 comprises a microprocessor, only the bus of which has been represented, designated by the reference 1, which controls a master station 2 which controls the installation. This station 2 applies, through the intermediary of a power output stage 3 comprising two buffers 4 and 5, digital signals in phase opposition of phasis through two conductors $L_1$ and $L_2$ constituting a bus providing the connection between the master station 2 on the one hand and the slave stations on the other hand, only two of which, designated by the references 8 and 9, have been represented, but which can be more in number.

The electronic circuitry of the master station 2 and of the output stage 3 is fed by a direct current line 10, while the slave stations each provide the power supply of their electronic circuitry by means of a rectifying circuit comprising four diodes 11, 12, 13 and 14 and a filter capacitor 15 which takes its power from the signals applied to the conductors $L_1$ and $L_2$, as it will be indicated later, these signals being as already mentioned in phase opposition. Thus, these signals serve not only to transmit the information from the master station to the slave stations but also to supply power to the slave stations.

The drawings figure also shows, but for the station 8 only, a decoding circuit of the bits received on the conductors $L_1$ and $L_2$ of the bus of the installation, which comprises a potential divider comprising two resistors 16 and 17 connected in series, a timer circuit 18 the output signal of which is applied to a flip-flop 19 receiving also a signal d from the potential divider 16-17. The output signal 9 of the flip-flop is applied to a conventional electronic circuit, which has not been represented, able to code the message which has been received.

Figure 2:
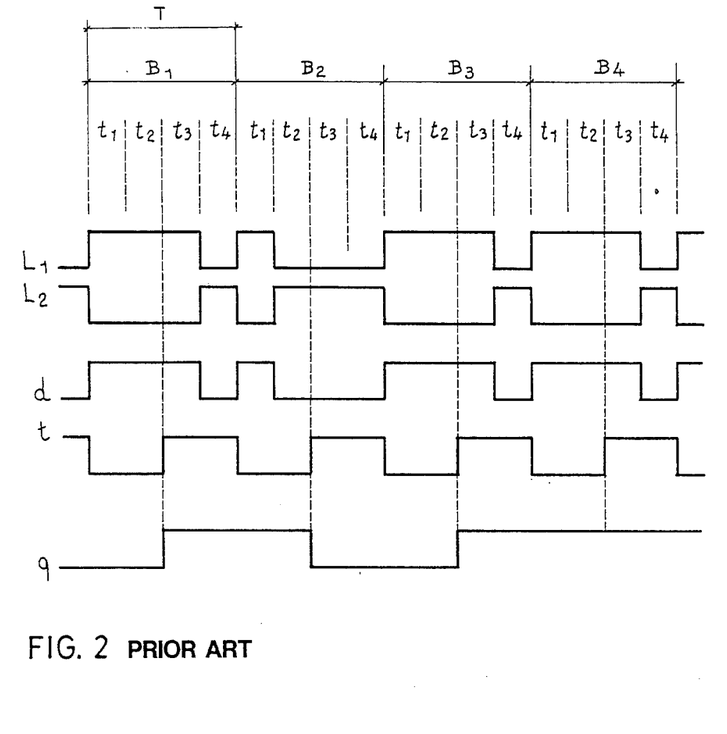
FIG. 2 is a diagram illustrating the mode of operation of the installation of FIG. 1.

FIG. 2 shows the operation of this part of the installation:

The message sent on the bus $L_1$, $L_2$ is constituted by a succession of signals "1" and "$\emptyset$", as in any digital information transmission. However, the shape of the bits of each of the signals is such that these bits comprise each two "dead" times (irrelevant zones). The whole transmission of a bit B entails a time T, which is subdivided into four intervals $t_1$, $t_2$, $t_3$ and $t_4$. Considering only the conductor $L_1$, it can be seen that the time $t_1$ is the sole moment of the time T which presents a positive flank, which indicates the start of a bit, and that at this time $t_1$ the signal on the conductor $L_1$ is always "1". The first of the dead times of this bit extends from the flank of $t_1$ up to the end of this time. The times $t_2$ and $t_3$ carry the state of the bit which is transmitted. Thus, the bits $B_1$, $B_3$ and $B_4$ carry a "1" while the bit $B_2$ carries a "$\emptyset$". During the time $t_4$, the signal is always at the state "$\emptyset$", so far as the conductor $L_1$ is concerned, thus ensuring the positive flank at the beginning of the next time $t_1$. The time $t_4$ not serving as a carrier of information, it constitutes a second dead time of the bit. Thus, one can easily recognize the two information components of a bit B, that is to say its start time, determined by the positive flank in the beginning of $t_1$, and its state, determined by the value of the signal at the times $t_2$ and $t_3$. The decoding process of the state of the bits is simple. This state being stable in the times $t_2$ and $t_3$, as represented in $L_1$ in FIG. 2, it is sufficient to pick up this state at the time $t_1+t_2$ measured from the positive flank of $t_1$. The timer 18 is activated by the positive flank of the signal d and maintains its output t at "$\emptyset$" during the time $t_1+t_2$.

The flip-flop 19 transmits and maintains at its output the state of d, at the moment of the positive flank of t, then retains it up to the next reception of a new bit, as it can be seen at g in FIG. 2.

It is obvious that the control of messages addressed to the stations is more complex. It is, however, not necessary to go further in the survey of this function since the circuits which are used do not concern the principal of the data transmission and make use of conventional electronic circuitry.

As it can be seen for the station 8 (FIG. 1), the electronic components 18 and 19 and the electronic circuitry which is associated therewith are fed from the rectifying circuit 11 to 15. This circuit operates as follows: when the voltage on the conductor $L_1$ is positive and consequently that on the conductor $L_2$ is negative, a current feeding and charging the capacitor 15 can circulate from $L_1$, through the diode 11, the capacitor 15 and the diode 14 to the conductor $L_2$; when the voltages on $L_1$ and $L_2$ are reversed, a current passes through the capacitor 15 in the same sense while conducted through the diodes 13 and 12.

The known installation of FIG. 1 permits the transmission of messages only in the sense of master station towards the slave stations.

Figure 3:
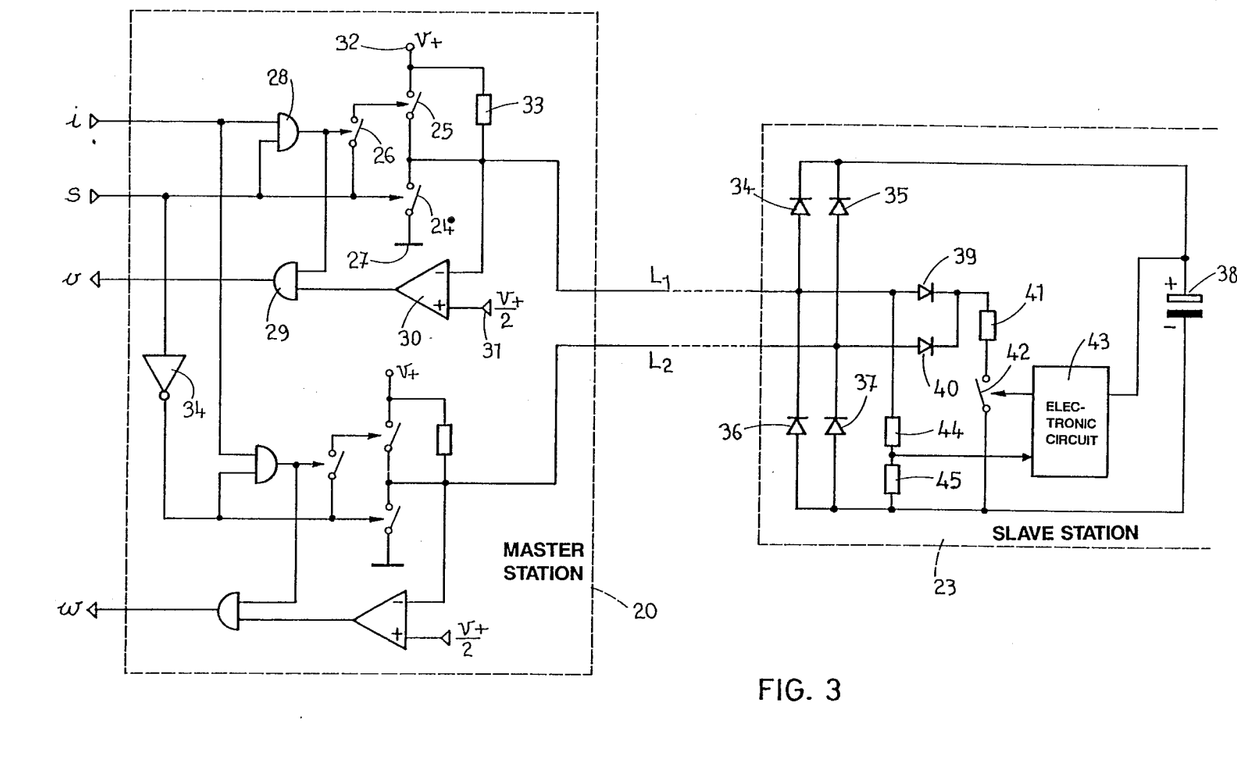
FIG. 3 illustrates diagrammatically an installation for the transmission of data enabling messages also to be addressed from the slave stations towards the master station, and FIGS. 4 and 5 respectively constitute a table, and diagrams, serving to explain the mode of operation of the installation of FIG. 3.

FIG. 3 shows partially and diagrammatically an installation which, while permitting as does the preceeding one, the sending of messages towards the slave stations and the power supply of their electronic circuitry, permits moreover the simultaneous sending of two messages towards the master station, coming from one or any slave station, including that one to which the master station is at the time transmitting.

In the case of the installation of FIG. 1, the buffers 4 and 5 of the output stage 3 each constitute a "Push-Pull" power stage operative to place the conductor $L_1$, at the tension $V_+$ and the conductor $L_2$ at the tension $\emptyset V$, respectively, if the input signal s applied by the master station 2 is at "1", or to place the conductor $L_1$ at $\emptyset V$ and the conductor $L_2$ at $V_+$ if the signal s is at "$\emptyset$". Thus, consequently, these buffers present only two states. In the case of the installation of FIG. 3, on the contrary, the buffers can be at three states, the third state corresponding to placing at high impedance (some hundreds of Ohms) the conductor under the control of an input signal i (inhibit), the signals carried by this conductor being able to be altered by one or the other of the slave stations, for instance by the connection of a load conducing its potential towards zero. This operation of the buffers will be explained in detail hereinafter.

The installation comprises a master station only the output stage 20 of which has been represented, a bus comprising only two conductors $L_1$ and $L_2$, and several slave stations such as 23 only a part of one of which has been represented. The output stage 20 receives from the master station a signal s, representing the message the master station has to send to the slave stations, and an inhibit signal i for the buffers. The master station receives from its output stage 20 signals v, w representing the messages the slave stations can send to the master station. The control electronics of the two conductors $L_1$ and $L_2$ being the same, only that one relating to the conductor $L_1$ will be described herein. The buffer comprises three switches (constituted in fact by transistors working as fully-conducting or cut-off 24, 25 and 26), the first one operating to connect the conductor $L_1$ to ground 27 (potential $\emptyset$) when it is closed, the second one to place it at the potential $V_+$ and the third one enabling the signal s controlling switch 25 to be applied only when switch 26 is closed, that is to say when the signal ihn is at $\emptyset$. It is to be noted that, when the voltages respectively controlling the switches 24, 25 and 26 are at "1" (logic value), switch 25 is closed and switches 24 and 26 are open, and vice versa. The switch 26 is actuated through the intermediary of an AND gate 28 the output of which controls one of the inputs of a second AND gate 29, the output of which carries one of the signals v able to be received at the master station. The other input of this AND gate 29 is constituted by the output of a comparator 30 one of the inputs of which is constituted by a potential source 31 the voltage value of which is half that of the source 32, that is to say $V_+/2$. The negative input of the comparator 30 is received from the conductor $L_1$ which is connected to the source 32 through a resistor 33.

The control electronics of the conductor $L_2$ is the same as that one which has been just described, with the difference that the signal s is applied through the intermediary of an inverter 34 since the signals applied to the conductors $L_1$ and $L_2$ must be of opposite phase, this electronics permitting the reception of the second signal w by the master station. The slave stations 23 comprise a rectifier, comprising four diodes 34, 35, 36 and 37 and a capacitor 38 ensuring together the supply of power to the whole electronic circuitry of the station. The operation of this feeding or supply of power is the same as in the case of the installation of FIG. 1, thus it will not be described here.

The two conductors $L_1$ and $L_2$ are connected, by two separating diodes 39 and 40 for the conductors, to a common resistor 41 connectable to the negative side of the capacitor 38 by an electronic switch 42. This switch, constituted by a transistor working as fully conducting or cut-off, is controlled by an electronic circuit 43 which itself receives control signals from the conductor $L_1$ through the intermediary of a voltage divider comprising two resistors 44 and 45 connected in series.

The slave stations 23 comprise moreover a decoder of the received signals, an electronic circuit for treatment of the messages received from the master station and an electronic circuit to control the messages intended to be sent to the master station, which being of usual construction will not be described herein.

Each buffer can adopt one of three states, that is to say a state "$\emptyset$" in which the corresponding conductor $L_1$ or $L_2$ is connected to ground 27, a state 1 in which the conductor is connected to the source $V_+$ 32 and a state X in which the conductor is not connected either to one or the other of these, that is to say in which it is at a high impedance, and one has in total nine possibilities some of which must be eliminated so that at no moment are the stations isolated from the reference potential $\emptyset V$.

Figure 4:
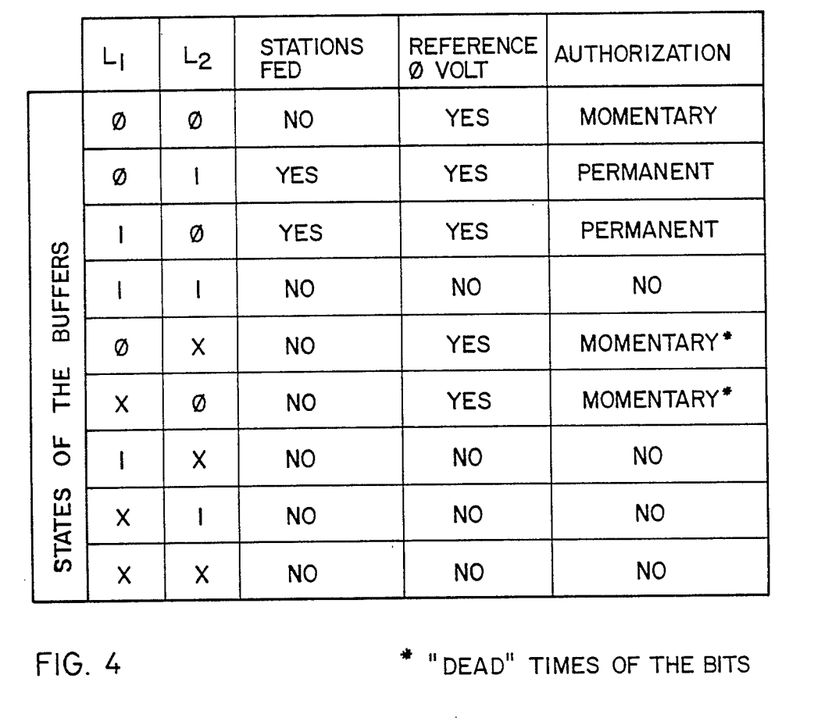

As shown in the table of FIG. 4, two states are permitted permanently and three for only a short time during which power is not supplied to the stations, that is to say in which it is the internal capacity at each of them which provides the interim operation.

The effect of the state X on the conductor $L_1$, with the restrictions indicated in the table of FIG. 4, that is to say limited duration for the state X and conductor $L_2$ at the state "$\emptyset$", which represents the first dead time of each bit, will be examined hereafter: The switches 24 and 25 being in the positions represented in FIG. 3 while the corresponding switches of the other buffer are closed, respectively open, since $L_2$ is at $\emptyset V$, it can be seen that the conductor $L_1$ will remain substantially at the voltage $V_+$, if it is at this voltage before the application of the state X and if the switch 42 remains open during this state X, this being due to the resistor 33. As a matter of fact, it decreases somewhat under the voltage appearing at the terminals of the capacitor 38. If, at this time, on the contrary, the logic circuit 43 closes the switch 42 during the state X of $L_1$, the tension of $L_1$ will be drawn to the potential "$\emptyset$" of $L_2$ through the circuit 39-41-42-37, the resistor 41 being of lower value than the resistor 33. The closing of the switch 42 alters in this way the signal carried by $L_1$. This alteration, during the state X of the conductor $L_1$, can be detected by the comparator 30 since, when the tension of $L_1$ passes from $V_+$ to $\emptyset V$, it of necessity passes through $V_+/2$, the output of the comparator 30 thus changing state while, if switch 42 remains open during the state X, $L_1$ remains substantially at the voltage $V_+$ and the output of 30 does not change. This operation is illustrated in detail in FIG. 5. As can be seen from that figure, one uses the time $t_1$ for sending data back through $L_1$ since the conditions of the conductors ($L_1=1$, $L_2=\emptyset$) permits putting $L_1$ to the state X.

Figure 5:
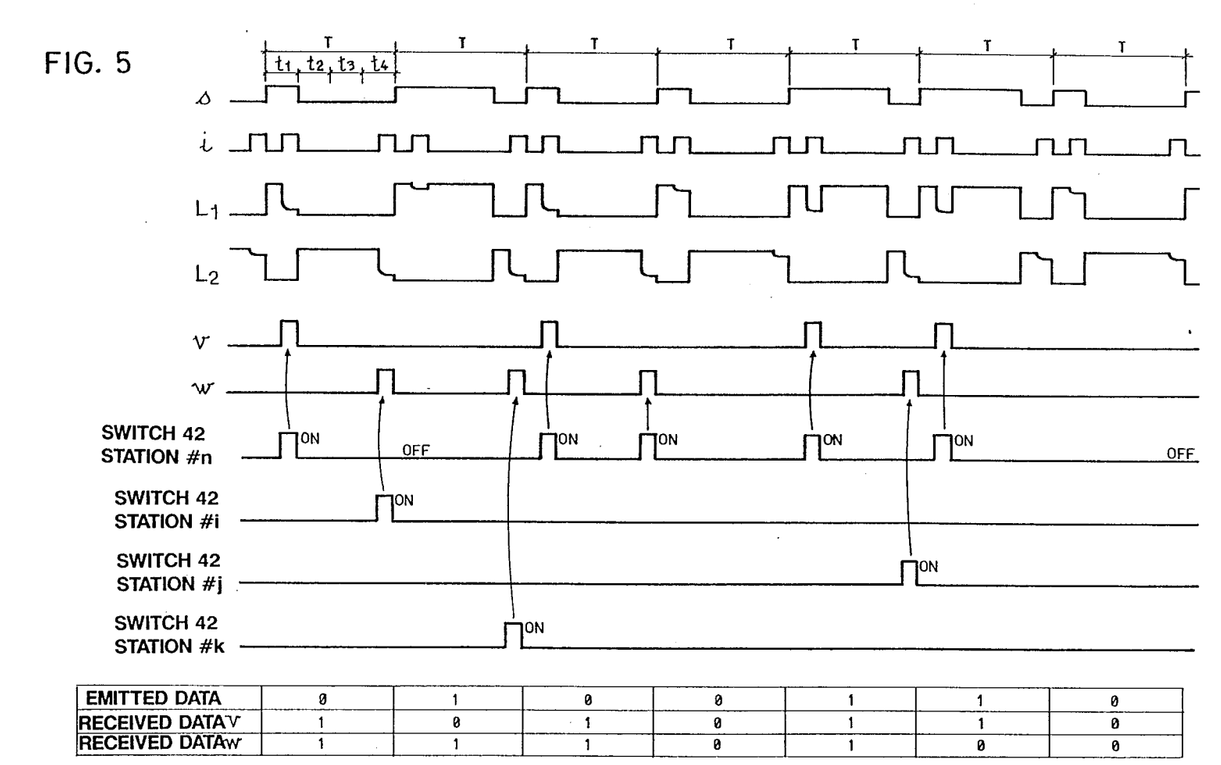

The situation is the same, but reversed, at time $t_4$ which permits the application at $L_2$, at this moment which represents the second dead time of each bit, the same processes as at $L_1$ at time $t_1$.

It is very important to note that this circuit has the great advantage of not using the energy stored in the capacitor 38 of the slave station for sending data back, but only the energy furnished by the conductors $L_1$ and $L_2$. Moreover if, by reason of bad operation, several stations were to respond at the same time, since the several switches 42 work in parallel, it would result in no damage to the electronic circuitry. Merely, the protocol of the messages would detect an error.

Thus, one has the possibility, which is very interesting, of sending back, during the actual time of emission of a message by the master station, not only one message, but two, which can be completely different and, what is more important, by several distinct stations as well by the same station, and always by means of a bus comprising only two conductors.

In summary, the method and the installation permit the following functions and in the indicated conditions:

1. Feeding of power to the slave stations obtained merely by rectifying the control signals which they receive, these signals being in phase opposition on the two conductors of the bus, so that there is not one stable conductor and a carrier conductor, but two carrier conductors.

2. Transmission of control signals from the master station to the slave stations, this by series transmission of digital signals. The bits of these signals are not of one piece but of a shape such that they present dead times permitting, in view of the execution of the function 3 listed hereafter, of rendering possible—by putting to high impedance one of the conductors of the bus—an alteration of these signals without jeopardizing their reception. Such an alteration consists in momentarily interrupting the faithful transmission of the signal in question.

3. Sending back, and this moreover simultaneously with the reception, of information from the slave stations in direction to and for the intention of the master station. This sent back information presents itself as the presence or absence of an alteration, by the respective slave stations, of the signals which they receive coming from the master station. If, at the moment when such an alteration is possible, that is to say when one or the other of the conductors of the bus is at high impedance, a slave station must take advantage of this possibility, that is to say alters the signal it receives, and it does it while charging strongly that one of the two conductors of the bus which is put at high impedance.

It is to be noted that the second manner of return of the messages (w) by $L_2$ can serve for various purposes. One could advantageously reserve it for the passage of interrupt signals generated by the stations.

A bus of this type, having no interrupt, does not allow the master station to know the requirements of the slave stations except by reading them one after the other. However, it frequently occurs that, for some reason, a slave station has an urgent conversation to establish. Consequently, it is necessary, for this purpose, to be able to interrupt the natural cycle of the messages.

Thus, in the present installation, any slave station equipped with the "interrupt" logic (there are stations where such an interrupt logic is not required) can, at each message, introduce or "interrupt" on the conductor $L_2$ at the moment of the passage of the bit the number of which counted from the beginning of the message corresponds to the number of the said station, that is to say to the binary code number of the specific addresses of the station.

Obviously, these interrupt signals appear only if one or other of the slave stations requests it after an internal process occurs.

By these means of processing, the master station can, in the sole passage of a message, not only detect if there is a request for interruption, but which is the station from which it emanates.

However, the number of the stations which can produce an interrupt is limited to the number of the bits contained in a message. This is not a drawback since the number of the stations needing an interrupt system remains, in most cases, relatively low.

The fact that the power supply or feeding of each of the slave stations is effected from the master station, by the intermediary of the bus, does not exclude feeding a slave station with a high power consumption by means of an external voltage source; it is sufficient, to this effect, to connect up this station in parallel with the capacitor of the station.

As a modification, one could provide only one back transmission channel instead of the two ones which have been shown in FIG. 3; in this case, the logic relative to the channel v or w which will have been eliminated in the master station becomes unused.

According to a modification, one could provide another possibility of information by means of the two conductors of the bus. As a matter of fact, the beginning of a message must be announced by sending a start message identifiable by reason of the absence of information during $2 \times T$, a time during which $L_1$ and $L_2$ are stable. However, only one conductor is sufficient for detecting, at this moment, for instance $L_1 = \emptyset V$. Excepted the fact that, as in the states X, the feeding would be momentarily absent, nothing would prevent generating on $L_2$ at this time one or several pulses passing from $V_+$ to $\emptyset V$, recognizable by the fact that $L_1$ remains at $\emptyset V$. These pulses could, for instance, announce the arrival of an exceptional message.

The present invention will find applications in all fields where control of automatized devices is required, for instance:

In the machine tools where one finds mainly slave stations with digital inputs/outputs for the control of security systems and of receipts, as well as for switching on several valves and contactors; in the robotic field and more specially in the control of long robots with linear ways where one finds not only slave stations for inputs/outputs, but also for positional control with respect to linear axes; in public buildings such as hotels, meeting centers, large constructions where it will be possible to control, by centralized information processing very different parameters such as, for instance, personalized lightings and their consumption, distributors of all kinds, several heating and air-conditioning zones, by the mere addition of two conductors to a single cable supplying the usual alternative current; in the show business industry where, up to now, the cables connected to the control panel have been of a very large number and could be replaced, as in the example of the buildings, by a single cable.

Many other technical fields for application of the invention could also be mentioned.

As a modification, the connection bus between the several stations could comprise more than two conductors.

I claim:

1. A method of electronic bidirectional transmission of data between a master station and a plurality of slave stations, including the feeding in of power to the slave stations by the master station along the same data transmission lines, comprising:

providing a bus for connecting the master station to the slave stations, said bus including at least two conductors in operable communication with the slave stations, the bidirectional transmission of data being provided by interrupting momentarily a portion of the total time of transmission of the data carrying signal of a bit produced by the master station on one of the two conductors of the bus to provide the capability of altering the data carrying signal received by said slave stations, the presence or the absence of such alterations constituting information which the slave stations transmit to the master station, the bits of the data carrying signals transmitted by the master station having a shape such that they present at least one dead zone or irrelevant time portion where they have no affect on the data carrying signal of the bit, where during said dead zone the momentary interruption of the transmission of the data carrying signal on one of the two conductors of the bus is effected without this interruption having any influence on the reception by the slave stations of the signals from the master station, thereby permitting the slave stations to transmit data back towards the master station at substantially the same time as they receive data from the master station.

2. The method as claimed in claim 1, in which data carrying signals are used, the shape of each bit of which includes at least two dead zones or irrelevant time portions enabling interruption of the transmission of the data carrying signal, one on one of the conductors of the bus and the other one on the other conductor thereof, which allows, during the reception of each signal by the slave stations, two return information transmissions in the direction of the master station, these two information transmissions coming both from the same slave station or from two different slave stations.

3. The method as claimed in claim 1, in which the transmission of a data carrying signal is interrupted while putting to high impedance one or the other of the two conductors of the bus.

4. The method as claimed in claim 3, in which the alteration of the data received by the slave stations is obtained by establishing a load on the one of the two conductors of the bus which is then placed at high impedance, the presence of the load being detectable by the master station.

5. An apparatus providing an electronic bidirectional transmission of data, comprising:
 a master station;
 a plurality of slave stations;
 a connection bus connecting all of said slave stations to said master station including only two conductors;
 means in said master station for the emission of digital signals intended for said slave stations which provide the feeding of power and the control of said slave stations, the shape of each bit of said digital signals having at least one dead zone or irrelevant time portion;

means in said slave stations for the reception and the interruption of said signals;

means in said master station for the interruption of the transmission of said signals on one of said two conductors of said bus, said means for interrupting operating during the dead zones of the bits of said signals; and means for enabling said slave stations to send back information to said master station during said interruptions of transmission, so that said sending back of information to said master station has no influence on the reception, by said slave stations, of said signals emitted by said master station.

6. The apparatus as claimed in claim 5, in which the means for interrupting the transmission of the signals coming from the master station are constituted by means putting one or the other of the conductors of the bus to a high impedance.

7. The apparatus as claimed in claim 5, in which the means enabling the slave stations to send information to the master station during the interruptions of the transmission of the signals are constituted by means for putting the conductor of the bus which is then at high impedance under load.

8. An apparatus providing an electronic bidirectional transmission of data, comprising:

a master station;

a plurality of slave stations;

a connection bus connecting all of said slave stations to said master station including only two conductors;

means in said master station for the emission of digital signals intended for said slave stations which provide the feeding of power and the control of said slave stations, said signals constituting the information said master station sends to said slave stations and which includes a sequence of pulses of the same duration T having four successive periods t1, t2, t3, t4, during the first period t1 of which the signal on one of the conductors of the bus is always positive and during the last one t4 of which the signal is always zero, so that the pulses always begin with a positive flank, at least one of said periods t1 and t4 being a dead zone or irrelevant time period, the signal being either positive or zero during the two other periods t2, t3, depending upon whether the pulse represents a bit of logic value 1 or of logic value 0;

means in said slave stations for the reception and the interpretation of said signals;

means in said master station for the interruption of the transmission of said signals on one of said two conductors of said bus, said means for interrupting operating during the dead zones of the bits of said signals; and means for enabling said slave stations to send back information to said master station during said interruptions of transmission so that said sending back of information to said master station has no influence on the reception by said slave stations of said signals emitted by said master station.

9. The apparatus as claimed in claim 8, in which at least one of the conductors of the bus is controlled, at the master station, by a buffer having three possible states in the first one of which the conductor is forced to a positive tension (V+), in the second one of which it is forced to a zero tension (0V) and in the third one of which it is released from the buffer, in which the master station applies, during the first or fourth period t1 or t4 of the duration (T), an inhibit pulse to the buffer so as to bring it into the third state, the conductor being moreover connected to a source of positive tension (V+) through the intermediary of a first resistor, and in which the slave stations which have to send a message back towards the master station comprise and electronic switch able to connect the conductor to ground through the intermediary of a second resistor of lower value than said first resistor, in such a way that, if the switch is closed during the third state, the conductor passes substantially to 0V during this period while it remains at V+ if the switch is not closed, the opening or the closing of the switch being detected, at the master station, by a comparator.

10. The apparatus as claimed in claim 9, in which the two conductors of the bus are each controlled at the master station by a buffer having three states, the master station applying to the buffer controlling one of the conductors an inhibit pulse during the second part of the first period t1 of said signal and to the buffer controlling the other conductor an inhibit pulse during the second part of the fourth period t4 of said signal.

* * * * *